United States Patent

Hamalainen et al.

Patent Number: 6,144,676
Date of Patent: *Nov. 7, 2000

[54] METHOD FOR ENHANCING DATA TRANSMISSION

[75] Inventors: Jari Hamalainen, Tampere; Harri Jokinen, Hiisi; Kari Jyrkka, Oulu, all of Finland

[73] Assignee: Nokia Mobile Phones Ltd., Espoo, Finland

[*] Notice: This patent issued on a continued prosecution application filed under 37 CFR 1.53(d), and is subject to the twenty year patent term provisions of 35 U.S.C. 154(a)(2).

[21] Appl. No.: 08/800,575

[22] Filed: Feb. 18, 1997

[30] Foreign Application Priority Data

Feb. 19, 1996 [FI] Finland ................................ 960752

[51] Int. Cl.$^7$ .............................. H04J 3/12; H04B 14/04; H03M 13/03

[52] U.S. Cl. ........................ 370/528; 375/242; 714/790

[58] Field of Search ................... 370/527, 528, 370/529, 472, 476; 375/242, 262, 265, 341; 371/21, 30, 31, 37.01, 37.2, 37.7, 38.1, 34.1, 43.1, 44, 45, 43.2, 43.4; 714/3, 6, 761, 762, 776, 779, 780, 752, 781, 786, 787, 788, 790, 320, 325, 375

[56] References Cited

U.S. PATENT DOCUMENTS

| | | | |
|---|---|---|---|
| 5,119,375 | 6/1992 | Paneth et al. | 370/95.1 |
| 5,257,257 | 10/1993 | Chen et al. | 370/18 |
| 5,349,589 | 9/1994 | Chennakeshu et al. | 714/790 |
| 5,384,782 | 1/1995 | Elms | 370/529 |
| 5,408,502 | 4/1995 | How | 375/340 |
| 5,416,787 | 5/1995 | Kodama et al. | 371/43 |
| 5,436,918 | 7/1995 | Kato et al. | 371/43 |
| 5,438,590 | 8/1995 | Tzukerman et al. | 375/259 |
| 5,502,721 | 3/1996 | Pohjakallio | 370/346 |
| 5,668,820 | 9/1997 | Ramesh et al. | 714/790 |
| 5,691,992 | 11/1997 | Molnar et al. | 371/37.1 |
| 5,721,732 | 2/1998 | Emeott et al. | 370/528 |
| 5,844,922 | 12/1998 | Wolf et al. | 714/790 |

FOREIGN PATENT DOCUMENTS

| | | |
|---|---|---|
| 0 535 812 | 4/1993 | European Pat. Off. . |
| 0 624 019 | 11/1994 | European Pat. Off. . |
| 0 643 510 | 3/1995 | European Pat. Off. . |

OTHER PUBLICATIONS

"New Rate–Compatible Punctured Convolutional Codes for Viterbi Decoding", L.H.C. Lee IEEE Transactions on Communications, vol. 42, No. 12, Dec. 1994, N.Y.

*Primary Examiner*—Chi H. Pham
*Assistant Examiner*—Steven Nguyen
*Attorney, Agent, or Firm*—Perman & Green, LLP

[57] ABSTRACT

A method and a system for expanding the capacity for transmission of information in a data frame which comprises at least an information element and a control element. After the data frame is subjected to channel coding, a portion of the control element is either removed or replaced by a divided portion of the information to be transmitted in the data frame.

4 Claims, 7 Drawing Sheets

| 1 | 2 | 3 | 4 | 5 | 6 | x | 7 | 8 | 9 | 10 | 11 | 12 | x | 13 | 14 | 15 | 16 | 17 | 18 | x |
|---|---|---|---|---|---|---|---|---|---|---|---|---|---|---|---|---|---|---|---|---|
| 19 | 20 | 21 | 22 | 23 | 24 | x | 25 | 26 | 27 | 28 | 29 | 30 | x | 31 | 32 | 33 | 34 | 35 | 36 | x |

METHOD FOR ENHANCING DATA TRANSMISSION

The invention relates to a method and a system for enhancing the transmission of information by data transmission in the form of a data frame which comprises at least an information element, in which at least part of the information to be transmitted is placed, and a control element, and which data frame is subjected to channel coding in order to form a channel-coded data frame, and in which method a burst to be transmitted on the communication path is formed of the channel-coded data frame. The invention relates further to a mobile station presented in the preamble of claim 17 and a base station presented in the preamble of claim 20.

BACKGROUND OF THE INVENTION

When information is transmitted in digital form from a transmitter to a receiver, a method is commonly used in which the information to be transmitted is divided into data frames. In addition to the actual information field, data frames can comprise also other elements, such as synchronization data fields and other control data fields. Further, a data frame can include e.g. parity control information for securing the accuracy of the data transmission. In this specification, the information field of the data frame will be called the information element and the other data fields will be called jointly the control element.

In data transmission between a mobile station and a base station, the conditions vary upon moving of the mobile station as well as upon changes in environmental and atmospheric conditions. Thus the data transmission is susceptible to disturbances, wherein the received information may contain errors. For elimination of errors e.g. in the GSM system, channel coding is used at the transmission stage and channel decoding accordingly at the receiving stage. In channel coding, error correction data is added to the information to be transmitted for example by generating parity control bits by an error correction algorithm and adding them to the information to be transmitted. At the receiving stage, the operation is inverse, wherein possible errors can be detected and the incorrect data corrected with the error correction algorithm, if the number of errors is smaller than or equal to the error correction capacity of the error correction algorithm.

In addition to the above-mentioned changes in conditions, problems are caused in data transmission between the mobile station and the base station also by a delay in the propagation of signals from the transmitter to the receiver. Because the distance between the mobile station and the base station changes, the signal propagation delay will change accordingly. For example in the GSM system, which is a so-called cellular system, the maximum radius of a cell is relatively long, of the order of 35 km. Thus also the propagation delay can vary to a significant degree, wherein the synchronization between the mobile station and the base station becomes difficult.

For the base station to operate as efficiently as possible, it must receive the information transmitted by the base stations in a predetermined time. For compensation of the propagation delay between the mobile station and the base station e.g. in the GSM system, so-called timing advance is applied. However, the length of the timing advance is not known until the mobile station has formed a connection to the base station. The timing is determined by means of a random access burst transmitted by the mobile station e.g. according to Slotted Aloha protocol. During transmission of the burst, the reception by the base station is not accurately synchronized, wherein the access burst comprises a relatively long synchronization bit sequence (synchronization data field). After the burst, there is still an extended guard period of 63.25 bits intended for eliminating the effect of the propagation delay between transmission and reception, i.e. overlapping of successive bursts upon reception.

Figure 2:
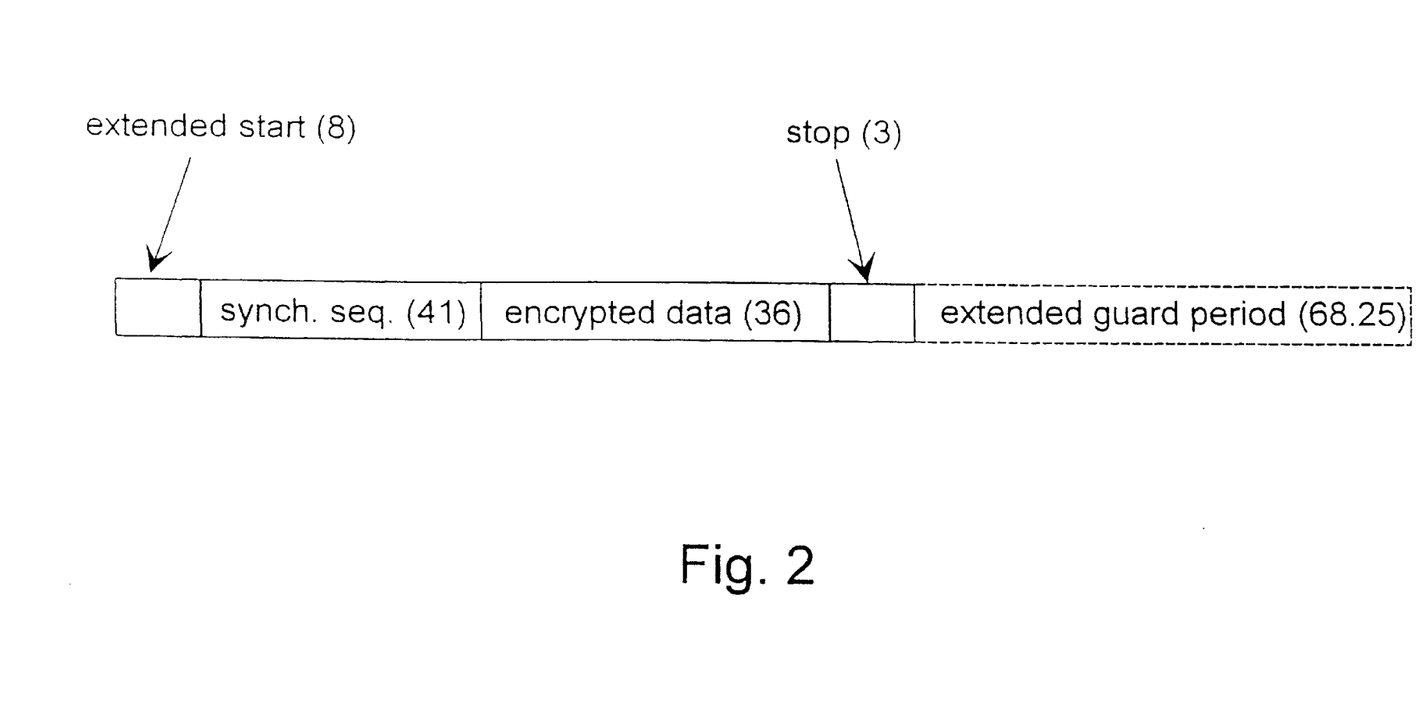
FIG. 2 shows an access burst according to GSM standard 05.05.

FIG. 2 shows an access burst according to GSM Standard 05.05. The burst comprises a starting data field (Extended Start) of 8 bits, a synchronization data field (Sync Sequence) of 41 bits, an information field (Encrypted Data) of 36 bits, and a terminating data field of 3 bits. The length of the guard period after the access burst is 68.25 bits. For increasing the probability of accurate reception, the bits are subjected to channel coding by so-called convolution coding which is also presented in GSM standard 05.05. The coding is conducted with a bit ratio of ½, wherein two bits are formed for each bit to be coded. Thus the number of information bits available is 18, including six parity bits and four tail bits. After this, only eight bits are available for user information. Part of these user information bits are used for informing the base station about a random number, wherein different mobile stations can be separated from each other at the base station. The rest of the user information bits are used e.g. for indicating the establishment cause of the message from the mobile station. For example in a bit sequence "101XXXXX", the binary digits 101 indicate that the establishment cause is an emergency message and the sequence XXXXX, where X can be either binary digit (0/1), indicates the random number selected by the mobile station. Thus the base station transmits as a response to the mobile station an acknowledgement message containing e.g. said random number, wherein the mobile station recognizes (with a certain probability) that the message is intended for it.

When the mobile station sends the base station a request for a channel for communication, the mobile station transmits a channel request message to the base station. The message contains also said random number. Since the number of bits available for the random number is limited (5 bits in the above-mentioned example), this may cause problems particularly in situations where there is a large number of channel request messages. For example in packet radio networks, each packet to be transmitted will usually require a channel request message.

Figure 1A:
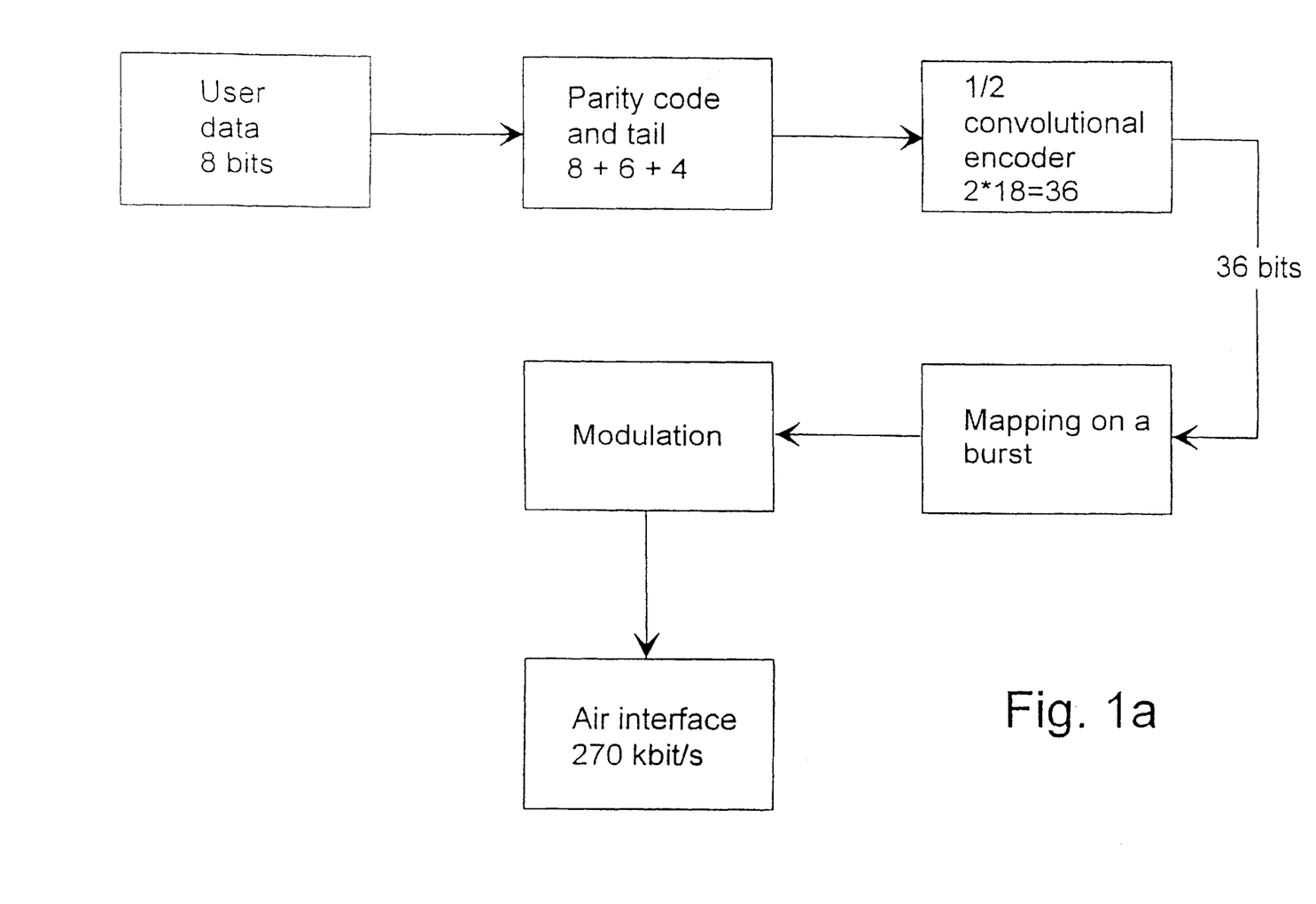
FIG. 1a is a reduced block diagram showing the method of transmitting a burst according to prior art.
Figure 1B:
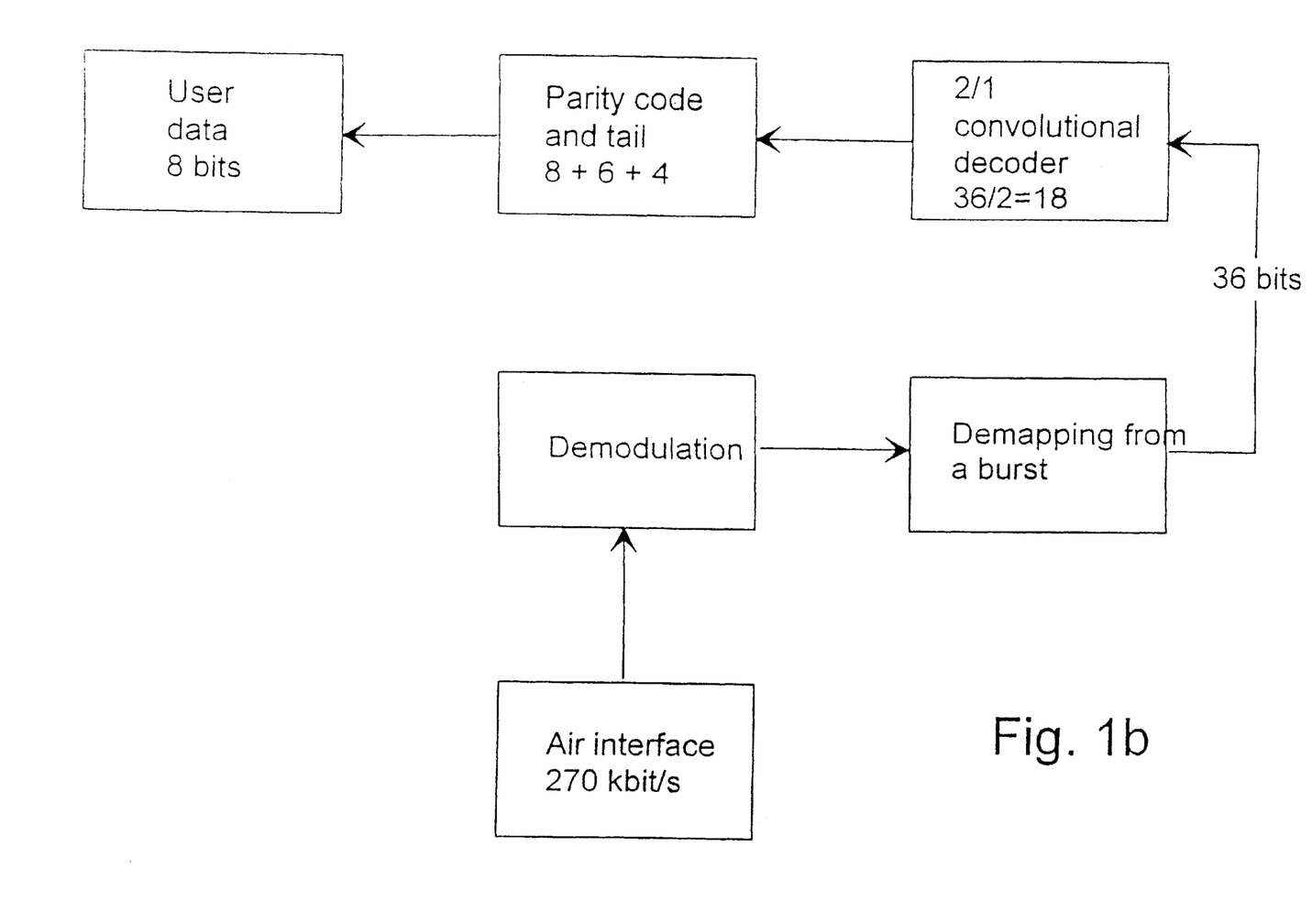
FIG. 1b is a reduced block diagram showing the method of receiving a burst according to prior art.

After channel coding, the coded bits are formed into a burst to be transmitted and conveyed to a modulator. FIG. 1a is a reduced block diagram showing such a method for transmitting an access burst according to the prior art. In a corresponding manner, FIG. 1b is a reduced block diagram showing the reception of a burst according to the prior art.

For enhancing the efficiency of information transmission, methods have been developed for changing the information to be transmitted in a denser, so-called packed form before transmitting the information on the communication path, such as a radio channel. Such methods are based e.g. on the idea that elements recurring in the information to be transmitted are searched for and allotted a suitable index. Thus the recurrent element is replaced by the index having a shorter form, whereby the quantity of information to be transmitted is reduced. Such recurrent elements can be e.g. combinations of letters recurring in a text, such as abc. In the conventional presentation form of 8 bits, 24 (=3×8) bits are required for presentation of these letters. When this combination is allotted an index of e.g. 5 bits and all letter combinations abc recurring in the data to be transmitted are replaced by this index, 19 (=24−5) bits are saved for each letter combination to be replaced. Further, a method can be used where, if the same character recurs several times in succession, e.g. four subsequent numbers 0, these can be replaced by indicating the character to be repeated and the number of recurrences of this character. Thus the packing density is higher, as long as these are recurring.

The methods described above are effective in situations where a large quantity of data, such as different types of files, can be subjected to packing. If the quantity of information to be packed at a time is small, such as in the transmission of an access burst, using the above-described methods may result in increasing the quantity of information to be transmitted. For instance when only a few bits are to be packed, the methods described above are not usable.

In a European patent application EP-535 812 there is provided a method of receiving data encoded to permit forward error correction wherein selected elements of a set of original data elements relating to a first message are substituted by data elements relating to a second message. The first and second messages are two different messages like traffic channel message (TCH) and Fast Associated Control Channel message (FACCH). This method does not increase the length of information that can be sent in a burst.

Upon expanding present mobile communication network services, it will be necessary that the receiving equipment required for implementing transmission of a larger quantity of information is substantially not different from the equipment used in applying previous services. Consequently, e.g. the implementation of a base station could be substantially the present one, with the exception of reasonable software changes.

SUMMARY OF THE INVENTION

The purpose of the present invention is to eliminate the above-mentioned disadvantages to a large extent and to provide a method and an apparatus for increasing the quantity of information that can be transmitted in a data frame in a manner that the length of the burst to be conveyed to the communication path is the same as that of the burst to be formed by methods of prior art. The invention is based on the idea that after channel coding of the data frame to be transmitted, part of the information to be formed in channel coding is modified. At the receiving stage, the channel-coded information is used for reconstruction of the part removed at the transmission stage, wherein after channel decoding, a reconstructed data frame is obtained that corresponds to the original data frame. The method of the invention is characterized in what will be presented in the characterizing part of the appended claim 1. The system of the invention is characterized in what will be presented in the characterizing part of the appended claim 12. The mobile station of the invention is characterized in what will be presented in the characterizing part of the appended claim 17. The base station of the invention is characterized in what will be presented in the characterizing part of the appended claim 20.

According to the first embodiment of the invention, the data frame to be channel-coded comprises the information to be communicated, wherein upon channel coding, part of the channel-coded data frame to be formed is removed before a burst is formed of the channel-coded data frame for transmission to the communication path.

According to the second embodiment of the invention, the information to be transmitted is divided preferably into two elements. The data frame to be channel-coded comprises the first information element to be transmitted, wherein part of the channel-coded data frame to be formed upon channel coding is replaced by the second information element after channel coding and before a burst is formed of the channel-coded data frame for transmission to the communication path.

The third embodiment of the invention combines the first and second embodiments of the invention. Thus the information to be transmitted is divided preferably into two parts. The data frame to be channel-coded comprises the first element of the information to be communicated, wherein part of the channel-coded data frame to be formed upon channel coding is removed, and another part is replaced by the second information element before a burst is formed of the channel-coded data frame for transmission to the communication path.

The invention gives considerable advantages as compared to methods and devices of prior art. Using the method of the invention, it is possible to transmit a larger quantity of information of a message in bursts of the same size than with methods known at present. The method of the invention is also adaptive, whereby for example upon a change in the disturbance conditions, it is possible to increase or decrease the quantity of information to be transmitted in each burst for securing as reliable a data transmission as possible.

The invention can be applied also in systems currently in use, wherein enhanced data transmission is used only in those connections where the system of the invention is available both at the transmitting and the receiving end.

DESCRIPTION OF THE DRAWINGS

In the following, the invention will be described in more detail with reference to the appended drawings, in which.

DETAILED DESCRIPTION OF THE INVENTION

Figure 5:
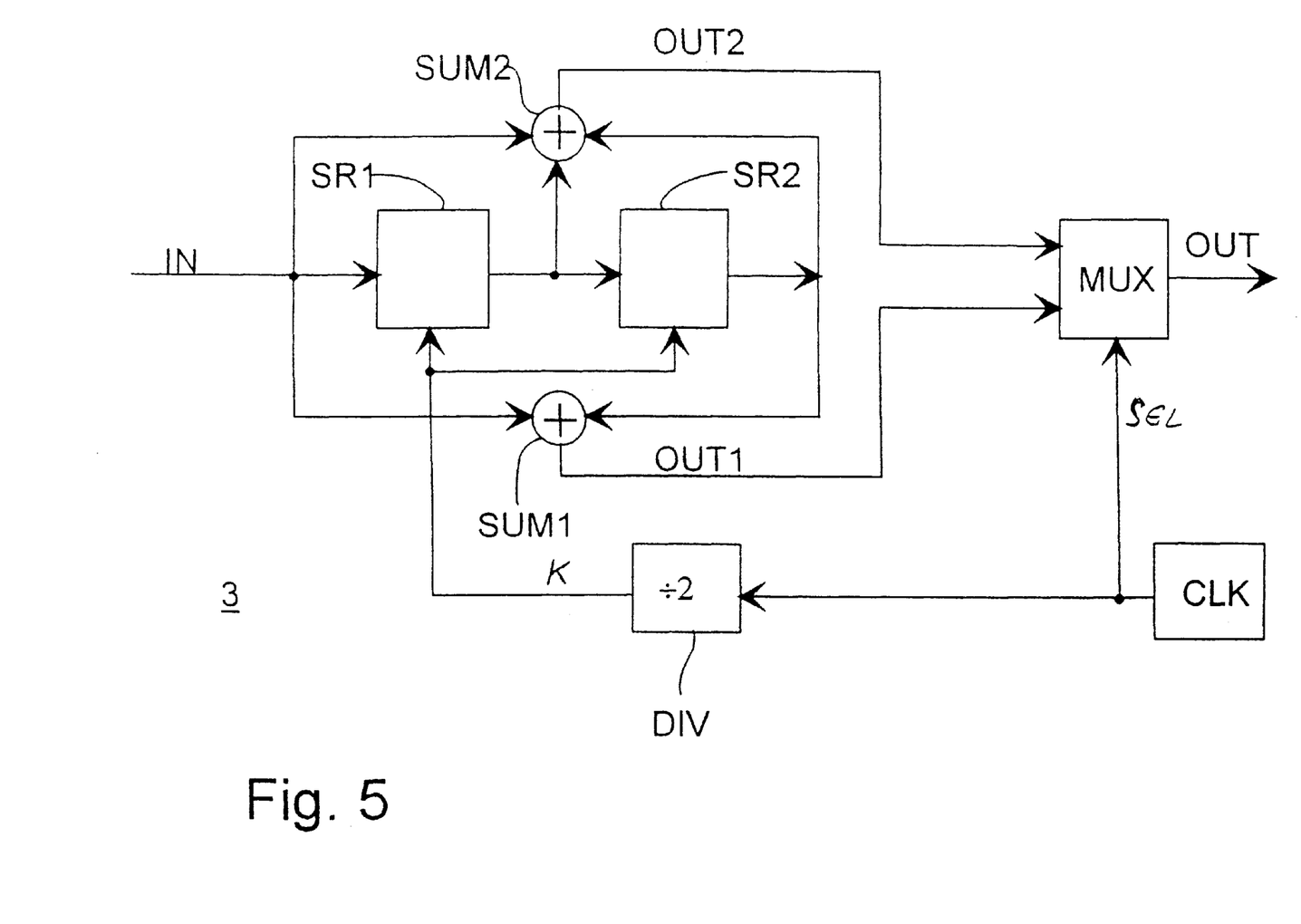
FIG. 5 is a reduced block diagram showing a channel coder known as such.

For describing the operation of the present Invention, the operation of a channel coder 3, known as such and illustrated as a reduced block diagram in FIG. 5, will be first described. The channel coder 3 is a non-systematic (3·2, 3·1) coder. An input IN is coupled to the input of a first shift register SR1 and to the first input of adders SUM1, SUM2. The output of the first shift register SR2 is coupled to the input of the second shift register SR2 and to the input of the second adder SUM2. The output of the second shift register SR2 is coupled to the third input of the second adder SUM2 and to the second input of the first adder SUM1. The output OUT1 of the first adder and the output OUT2 of the second adder are coupled to the inputs of a selector MUX, wherein the output of the selector MUX forms the output OUT of the channel coder 3. The state of the output of the first adder depends on the state of the input IN according to the formula a(D)(D$^{2+}$1), where a(D) indicates information to be led to the input IN, D$^2$ indicates the state of the input IN at a moment of time t−2 (=the state of the output of the second shift register SR2) and D indicates the state of the input IN at a moment of time t−1 (=the state of the output of the first shift register SR1). In a corresponding manner, the state of the output of the second adder depends on the state of the input IN according to the formula a(D)(D$^{2+}$D+1). The output of the adder SUM1, SUM2 is in state 1, when there is an odd number of states 1 in the inputs of the adder SUM1, SUM2. In other cases, the output of the adder SUM1, SUM2 is in state 0.

Consequently, the channel is a kind of a state machine, where the output of the channel coder is aft not only by the bit to be coded at a time but also by part of he states of prior coded bits The block diagram of FIG. 5 shows also a timing circuit CLK, which is used inter alia for transmitting the data in the Input of the shift register SR1, SR2 to the output of the shift register SR1, SR2 and for forming a control signal SEL, by means of which the selector MUX selects the signal at the first or second output of the selector MUX for the output OUT, i.e. the state of the output of the second adder SUM2 or of the first adder SUM1. For instance, when the control signal SEL of the selector is in state 0, the output of the selector MUX contains the state of the second adder SUM2, and when the control signal SEL of the selector is in state 1, the output of the selector MUX contains the state of the first adder SUM1. The control signal SEL is advantageously a rectangular wave with a frequency twice the frequency of the trigger signal K of the shift registers SR1, SR2. In the exemplifying coupling of FIG. 5, this is implemented by coupling the output of the timing circuit CLK to the control input of the selector MUX and to the input of the two-divider DIV. The output of the two-divider DIV is coupled to the trigger inputs of the shift registers SR1, SR2. The timings can be implemented also by other methods known as such to an expert in the field, e.g. using application software of a microprocessor.

In the following, the operation of the channel coder 3 will be described using as an example a data frame a(D) where the information element consists of the bit sequence 0101 and the control element is 0000, where 0 indicates the logical state 0 and 1 indicates the logical state 1. In practical applications, the logical state 0 is usually a voltage value of about 0 V and the logical state 1 is, in a corresponding manner, about a supply voltage which is for example ca. 3.3 V. The bit sequence is given in chronological order from the left to the right, i.e. the first bit is 0. The information a(D) is led to the input IN of the channel coder 3. Thus the output OUT1 of the first adder is in state 0 and the output OUT2 of the second adder is also in state 0, when it is assumed that the shift registers SR1, SR2 are first in state 0. The output of the selector MUX is 0 during the state 0 and the state 1 of the control signal SEL, so that a bit sequence 00 is formed in the output of the channel coder 3. The next input bit is 1, and the shift registers SR1, SR2 are in state 0, wherein the output OUT1 of the first adder and the output OUT2 of the second adder are in state 1. Thus the output of the selector MUX is in state 1 during the state 0 and the state 1 of the control signal SEL, wherein a bit sequence 11 is formed in the output of the channel coder 3. The next bit is 0, the shift register SR1 is in state 1 and the shift register SR2 is in state 0. Thus a bit sequence 01 is formed in the output of the channel coder 3. The fourth bit is 1, the shift register SR1 is in state 1 and the shift register SR2 is in state 1. Thus a bit sequence 00 is formed in the output of the channel coder 3. With the bits of the control element, the bit sequence 01110000 is formed in the output. The significance of the control element here is, inter alia, that even the last information bit has travelled through the shift registers SR1, SR2 of the channel coder. For this purpose, the shift registers SR1, SR2 of the channel coder are stepped at least twice after the last bit of the information element, wherein the length of the control element should be at least two bits. In this example, the data frame a(D) 01010000 is thus coded as the bit sequence 0011010001110000. In practical applications, the control element of a data frame usually comprises more than one control data field, as shown in FIG. 2.

Figure 3A:
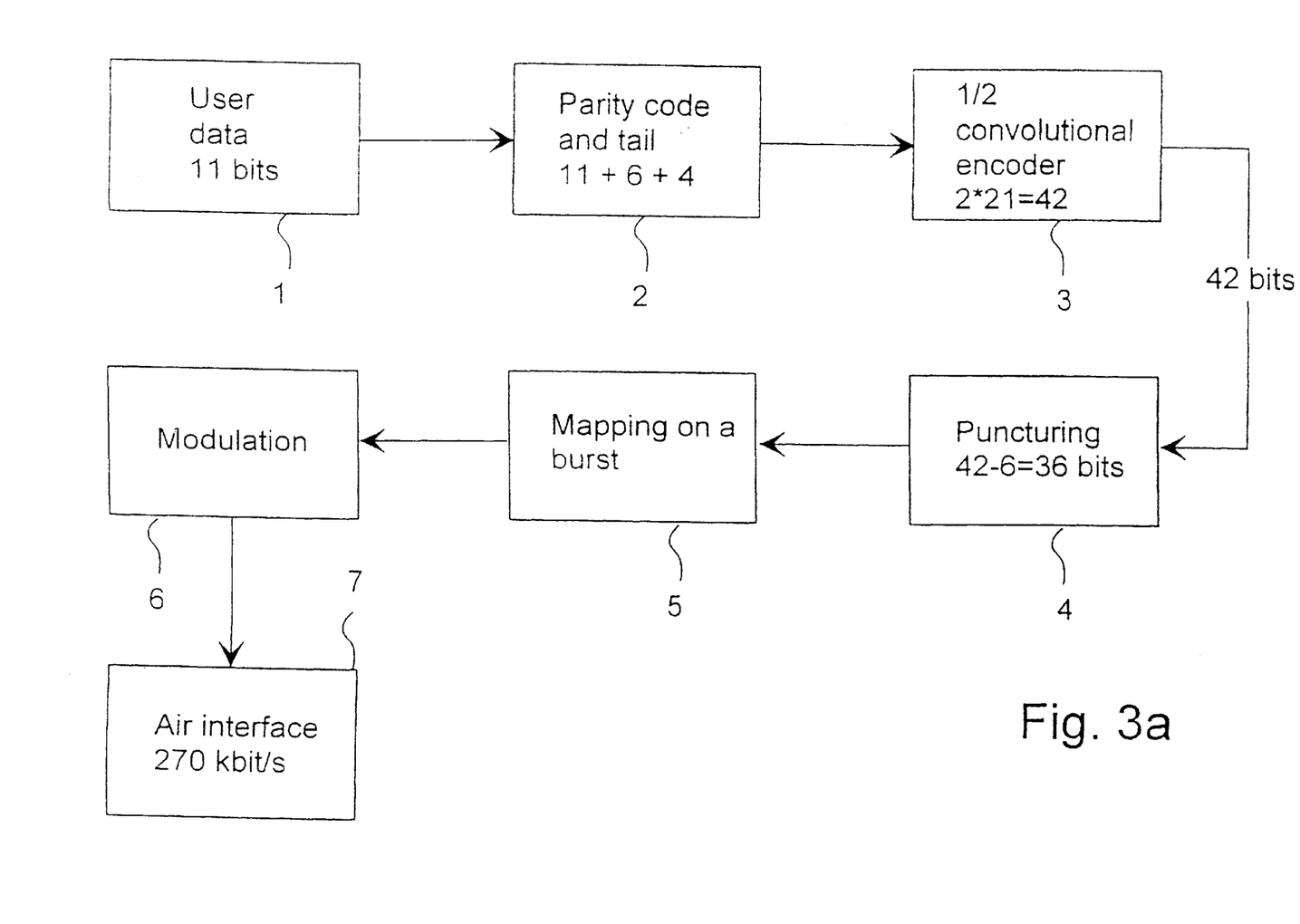
FIG. 3a is a reduced block diagram showing the method of transmitting information according to an advantageous embodiment of the invention.
Figure 4:
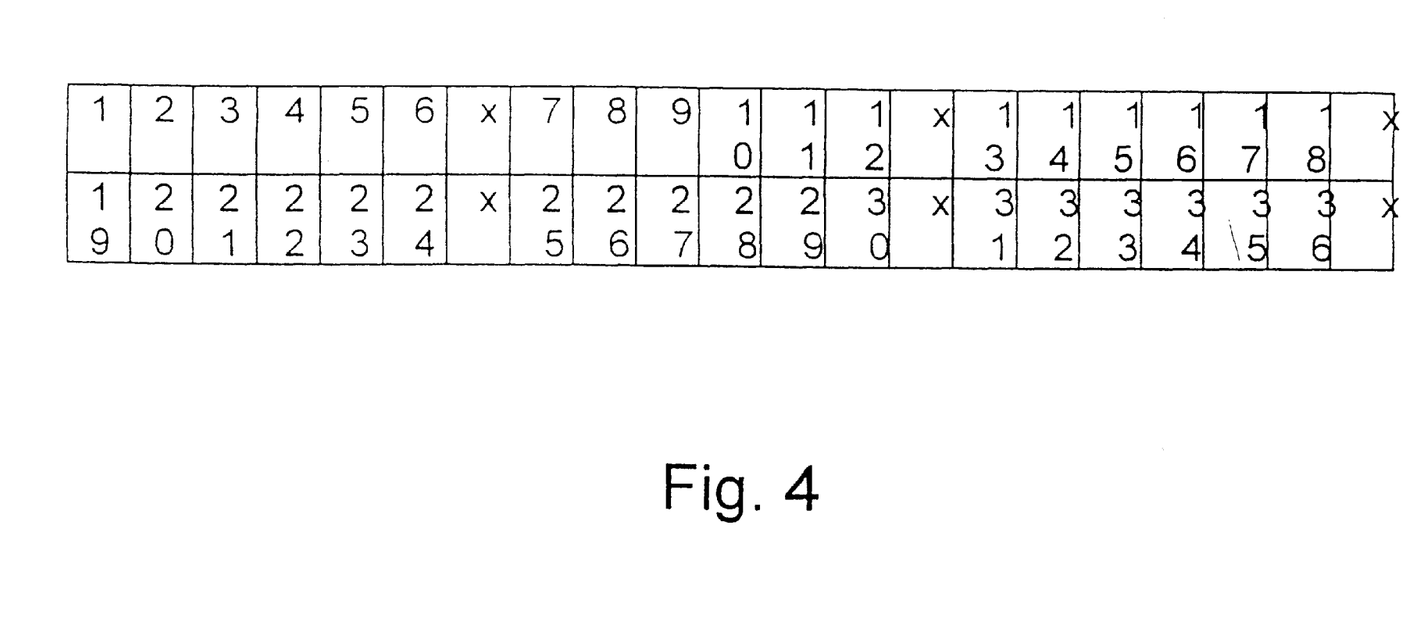
FIG. 4 shows a channel-coded dataframe.

In the following, the operation of the method of the invention will be described with reference to the block diagram of FIG. 3a. In this example, the information to be sent comprises 11 bits, and in a case of prior art, as described above in this specification, the information that can be transmitted in an access burst comprises eight bits. A bit formation block 1 forms the information element of the data frame to be transmitted, comprising for example an establishment cause code and a random number. The information element is conveyed to a parity formation circuit 2 where the data frame is supplied with a control element which in this example comprises a 6-bit parity and 4 tail bit. Thus at this stage the data frame comprises 21 bits. The data frame is conveyed to a channel coder 3, where the data frame is channel-coded with a bit ratio of ½, whereby the output of the channel coder yields a 42-bit channel-coded data frame. The coding is conducted preferably with a convolution code which is an error correction code (Forward Error Correction). The channel-coded data frame is subsequently conveyed to a puncturing means 4. The puncturing means 4 removes part of the bits of the information frame. In this example, 6 bits are removed, thus yielding a 36-bit channel-coded truncated data frame according to GSM standard 05.05. FIG. 4 shows a channel-coded data frame, from which every seventh bit is removed. The puncturing means 4 can be implemented e.g. on the principle of a shift register with a serial input.

Thus the bit removal can be conducted for example by not triggering the shift register at the bits to be removed.

In the next step, the channel-coded truncated data frame is conveyed to a burst coding means 5, in which the data frame is supplied with a starting data field, a synchronization data field and a terminating data field, wherein the burst to be transmitted is generated. From the burst coding means 5, the burst is led to a modulator 6, wherein the modulated signal is conveyed to a transmitter 7 to be broadcast on a radio channel, which is known as such.

Figure 3B:
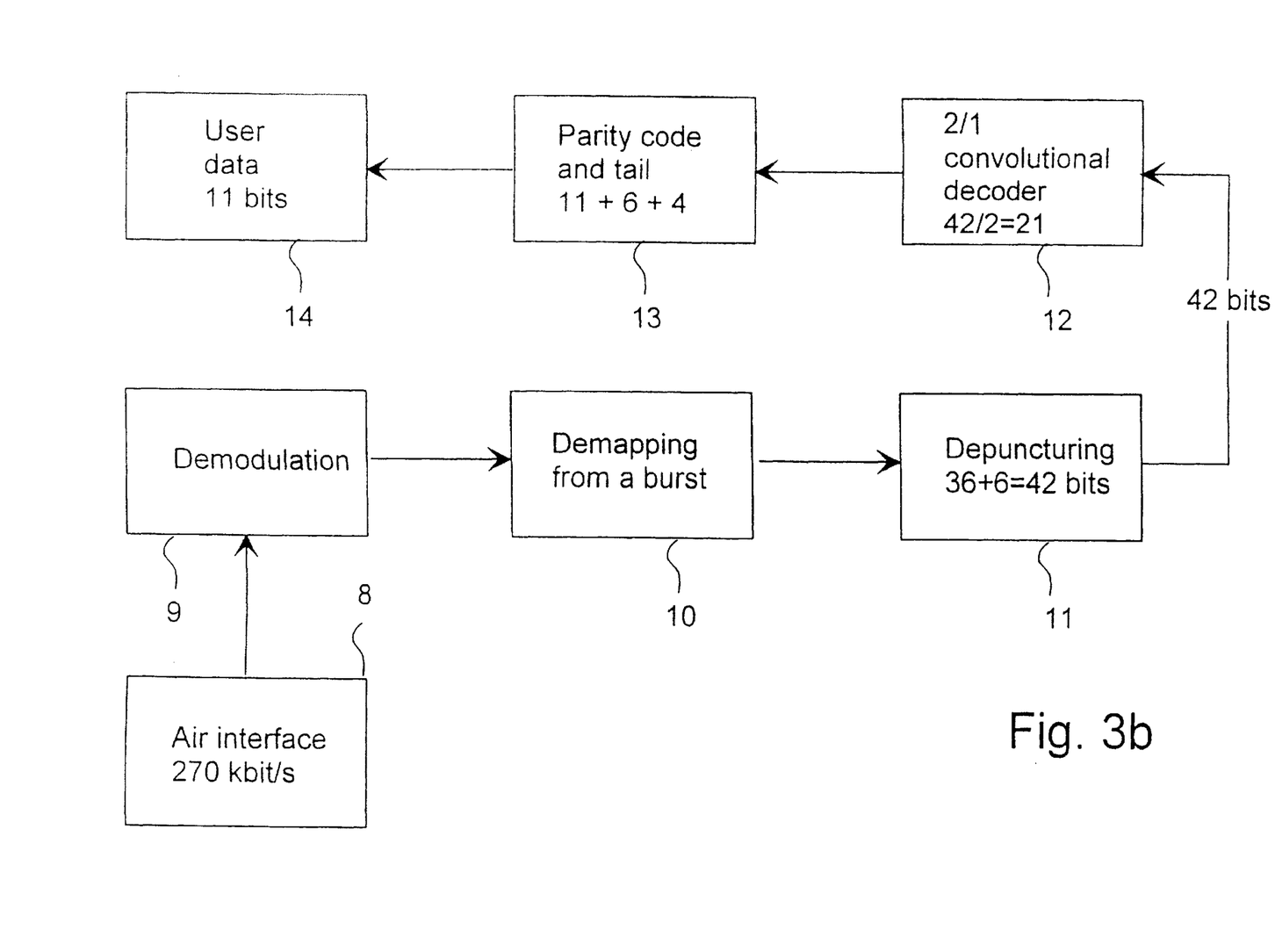
FIG. 3b is a reduced block diagram showing the method of receiving information according to an advantageous embodiment of the invention.

The receiving step is illustrated in a reduced block diagram in FIG. 3b. A receiver 8 receives the signal broadcast on the radio channel and conveys it to a demodulator 9. The demodulator 9 gives a demodulated signal indicating the transmitted burst. In a burst decoding means 10, a channel-coded truncated data frame (36 bits) is separated from the burst and conveyed to a depuncturing means 11 where the missing bits (6 bits) are added. The bits to be added can be set e.g. zero, irrespective of the values of the bits removed at the transmission step. The completed data frame is conveyed to a channel decoder 12 where the channel coding is decoded. The channel decoder 12 is capable of reconstructing the original 21-bit data frame in spite of the fact that the bits added at the receiving stage may not correspond to those removed at the transmission stage. The channel decoder interprets them as inaccurately received bits, wherein the error correction algorithm used for channel decoding reconstructs the correct information.

The data frame is still conveyed to a parity control means 13 where the actual 11-bit information element-is separated from the data frame and its correctness can be checked. In some applications, the parity control means 13 is capable of correcting still some possible inaccuracies in the information element. The output of the parity control means 13 contains now the information elerhent corresponding to the original.

The invention can also be applied in a manner that the information element is divided preferably into two parts, wherein the first information element is placed in the information field of the data frame. The length of the first information element is e.g. eight bits and the length of the second information element is e.g. three bits. This embodiment operates in a way that the channel coding of the information frame is conducted normally, and in the subsequent channel coding of the control element, some of the bits of the frame to be formed on the basis of the coding are replaced by bits of the second information element. This can be conducted for example by coupling a second selector (not shown) to the output of the selector MUX of the channel coder; this second selector is used for selecting either the state of the output of the selector MUX or the bit of the second information element as the state of the output of the channel coder 3. At the receiving stage, it is known which bits belong to the second information element, wherein a data frame corresponding to the original data frame can be reconstructed on the Lasis of the received and decoded burst.

The triggering of the shift registers SR1, SR2 of the channel coder 3 can be interrupted at the stage when the bits of the second information element are inserted in the data frame of the channel-coded data frame. Thus before channel coding of the next data frame, the shift registers SR1, SR2 are advantageously set in a known initial state, such as state 0.

At the receiving stage, it is not necessary to add bits to the decoded burst before channel decoding. Instead, the second information element is formed in the depuncturing means 11 on the basis of the bits which have been replaced by bits of the second information element at the transmission stage.

The second embodiment of the invention can also be implemented in a way that bits of the second information element are used to replace part of the bits of the control element, preferably tail bits, in the input of the channel coder. This takes place preferably during formation of the data frame for example so that the bits of the second information element are used to replace the starting bits of the control element after the information frame in the data frame. The data frame is subsequently channel-coded. Also in this embodiment, the length of the channel-coded data frame is not increased during channel-coding. Using this method according to the second embodiment of the invention, it is possible to achieve a slightly better frame error ratio than by using the method of the first embodiment shown in FIGS. 3a and 3b, provided that the need for additional information bits is not very high.

Instead of replacing tail bits, it is possible to use a closely related "tail biting" technique. In this case the function of the tail bits is covered by coding the data block as if it were cyclic. Thus the second information element contains preferably the first data bits with which the shift register of the channel coder 3 can be initialized. Finally, the bits of the second information element are fed into the shift register instead of the tail bits. Thus the initial state of the channel coder follows the terminating state, wherein no tail bits are required for ending the coding into a known initial state.

The methods presented above can also be combined, wherein some of the tail bits are replaced by information bits and also part of the channel-coded data frame is removed. In this case the quantity of information to be transmitted can be even larger.

The present invention can also be applied in a way that the quantity of the information to be transmitted in a data frame can vary according to the need, whereby in the first embodiment of the invention the length of the data frame to be led to the channel coder is changed accordingly, and in the method according to the second embodiment of the invention, only a required quantity of control bits are used for transmitting information. Naturally, the error correction capacity will be impaired with methods different from the original application, but this is a necessary compromise when it is desired to increase the quantity of information in relation to redundancy allowing for error correction.

The base station can use e.g. a broadcast control channel (BCCH) or packet broadcast control channel (PBCCH) for communicating to the mobile station whether the base station avails of data transmission according to prior art or enhanced data transmission according to the present invention. Furthermore, the broadcast control channel can be used for communicating how many bits of information the data frame to be transmitted contains.

Enhanced data transmission according to the invention can be implemented in practical systems also by forming different types of data transmission formats. For example, the number of data bits varies in different formats. Each format has an identification code of its own. Thus the base station communicates advantageously via a broadcast control channel, which format the base station proposes to be used for data transmission. A mobile station implementing the method of the invention utilizes the proposed format in the data frame to be transmitted. The format to be used can vary even during one and the same connection.

For applying the method according to the invention in already existing devices and systems, no changes are required in the modulation and radio parts, because standard bursts can be used.

An example of a message that can be transmitted by the method according to the invention is a message of a GSM packet radio system comprising:

information on whether the mobile station is of the full duplex or the half duplex type on the RF level (1 bit), the quantity of time intervals desired for data transmission; a maximum of eight time intervals can be requested with three bits, priority (2 bits), a random number (5 bits).

The total length of the message is thus 11 bits.

An extended information element according to the invention can be transmitted e.g. in the GSM system in a random access burst, but also other bursts can be used.

The apparatus according to the invention can be implemented to a large extent by changes made in the application software of mobile stations and base stations.

The invention can be applied e.g. in cellular systems. Known cellular systems include GSM systems, PCN systems, such as the DCS 1800 system, and PCS-1900 systems.

The method according to the invention can be used for example for increasing the channel capacity of a GSM system. Thus at the beginning of the information element of a data frame to be transmitted as a random access burst, a space is required for bits of the establishment cause code of the message, e.g. according to the second phase of the GSM system. Other bits of the information element can be used according to the embodiment in question, for different purposes. Advantageously, the enhanced data transmission method according to the invention is available on new channels, and the method of prior art can be used on old channels.

The channels can be so-called logical channels which are provided e.g. with certain time intervals in which the data transmission takes place. An application of this kind is e.g. in a GSM system based on time division multiple access (TDMA).

The invention is not limited solely to convolution codes with a bit ratio of ½, but it can be applied also in other channel coding methods.

The invention is neither limited in that the modification of the channel-coded data frame is conducted after channel coding, but it can also be conducted in connection with channel coding.

The method of the invention is not limited solely to the examples presented above, but it can be modified within the scope of the appended claims.

What is claimed is:

1. A mobile station for expanding the information carrying capacity of a data frame, said data frame being fixed in length and having an information part and a control part, wherein said mobile station comprises: means for channel coding of the data frame; means for modifying the channel-coded data frame; and means for transmitting the channel-coded data frame in a burst, and further wherein an information packet to be transmitted exceeds the space provided for such information in the information part of said data frame, characterized in that the information to be transmitted is divided into a first information element and a second information element, the length of said first information element equal to the length of said information part of said data frame;

wherein said means for modifying the channel-coded data frame inserts said first information element in said information part of said data frame and removes a portion of said control part of said channel-coded data frame; and further wherein said means for modifying the channel-coded data frame replaces said removed portion of said control part of said channel coded data frame with said second information element.

2. In a mobile station for transmitting a data frame, said data frame having a fixed length and including an information part and a control part, wherein said mobile station comprises: means for channel coding of the data frame; means for modifying the channel-coded data frame; and means for transmitting the channel-coded data frame in a burst and further wherein an information packet to be transmitted exceeds the space provided for such information in the information part of said data frame, a method for expanding the information carrying, capacity of a data frame comprising the steps of:

dividing the information to be transmitted into a first information element and a second information element, said first information element being equal in length to said information part of said data frame;

inserting said first information element in said information part of said data frame;

removing a portion of said control part of said channel-coded data frame;

replacing said removed portion of said control part of said channel coded data frame with said second information element; and transmitting said modified channel coded data frame.

3. A mobile station for expanding the information carrying capacity of a data frame, said data frame being fixed in length and having an information part and a control part, the length of said information part is 8 bits, the length of the control part is 10 bits comprising 6 parity bits and 4 tail bits, wherein said mobile station comprises: means for channel coding of the data frame by ½-rate convolution coding, means for modifying the channel-coded data frame in a burst, the length of said channel-coded data frame in said burst is 36 bits, and further wherein an information packet to be transmitted exceeds the space provided for such information in the information part of said data frame, characterized in that the length of said information packet to be transmitted is 11 bits, that the length of said channel-coded data frame after ½-rate convolution coding is 42 bits, that said burst is a random access burst, and that the mobile station comprises further means (4) for modifying the channel-coded data frame by removing part of it, wherein the channel-coded data frame is modified by removing 6 bits of the channel-coded data frame before transmission.

4. A method for expanding the information carrying capacity of a data frame, said data frame being fixed in length and having an information part and a control part, the length of said information part is 8 bits, the length of the control part is 10 bits comprising 6 parity bits and 4 tailbits, and which data frame is at the transmission stage subjected to channel coding by ½-rate convolution coding in order to form a channel-coded data frame, and in which method the channel-coded data frame is transformed into a burst to be transmitted on the communication path, the length of said channel-coded data frame in said burst is 36 bits, and further wherein an information packet to be transmitted exceeds the space provided for such information in the information part of said data frame, characterized in that the length of said information packet to be transmitted is 11 bits, that the length of said channel-coded data frame after ½-rate convolution coding is 42 bits, that said burst is a random access burst, and that the channel-coded data frame is modified by removing part of it, wherein the channel-coded data frame is modified by removing 6 bits of the channel-coded data frame before transmission.

* * * * *